(12) United States Patent
Ito et al.

(10) Patent No.: US 7,565,114 B2
(45) Date of Patent: Jul. 21, 2009

(54) TRANSMITTER APPARATUS, RECEIVER APPARATUS, AND RADIO COMMUNICATION SYSTEM

(75) Inventors: Takumi Ito, Tokyo (JP); Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 626 days.

(21) Appl. No.: 10/564,552

(22) PCT Filed: Jul. 16, 2004

(86) PCT No.: PCT/JP2004/010538

§ 371 (c)(1),
(2), (4) Date: Jan. 13, 2006

(87) PCT Pub. No.: WO2005/008931

PCT Pub. Date: Jan. 27, 2005

(65) Prior Publication Data

US 2006/0166625 A1 Jul. 27, 2006

(30) Foreign Application Priority Data

Jul. 16, 2003 (JP) .............................. 2003-275333

(51) Int. Cl.
*H04B 1/00* (2006.01)
*H04B 7/00* (2006.01)

(52) U.S. Cl. ........................ 455/69; 455/13.4; 455/63.1; 455/115.3; 455/127.5; 455/450; 455/562.1; 375/267; 375/295; 375/316; 370/334

(58) Field of Classification Search .................. 455/69, 455/63.1, 450, 562.1, 13.4, 101–104, 114.2, 455/115.1–115.3, 127.1–127.5; 370/329, 370/334; 375/260, 267, 295, 299, 316

See application file for complete search history.

(56) References Cited

U.S. PATENT DOCUMENTS 7,006,579 B2 * 2/2006 Kuchi et al. .................. 375/295

(Continued)

FOREIGN PATENT DOCUMENTS

JP 57-155856 9/1982

(Continued)

OTHER PUBLICATIONS

K. Miyashita et al., "Eigenbeam-Space Division Multiplexing (E-SDM) in a MIMO Channel," The Institute of of Electronics, Information and Communication Engineers, vol. 102:86, May 24, 2002; pp. 13-18.

(Continued)

*Primary Examiner*—Matthew D Anderson
*Assistant Examiner*—Shaima Q Aminzay
(74) *Attorney, Agent, or Firm*—Foley & Lardner LLP (57) ABSTRACT

An SINR estimating unit of a receiver apparatus measures first and second demodulated signals to calculate SINR (ratio of signal power to sum of interference power and noise power) for each signal sequence. A transmission parameter deciding unit decides, based on the SINR, a transmission parameter used by a transmitter apparatus for controlling the transmission for each signal sequence, and then feeds the decided transmission parameter back to the transmitter apparatus. First and second mapping units of the transmitter apparatus controls, based on the transmission parameters as fed back, the modulation level for each signal sequence.

20 Claims, 8 Drawing Sheets

U.S. PATENT DOCUMENTS

| | | | |
|---|---|---|---|
| 2002/0154705 A1* | 10/2002 | Walton et al. | 375/267 |
| 2003/0003937 A1 | 1/2003 | Ohkubo et al. | |
| 2003/0139139 A1* | 7/2003 | Onggosanusi et al. | 455/63 |
| 2004/0002364 A1* | 1/2004 | Trikkonen et al. | 455/562.1 |
| 2004/0052315 A1* | 3/2004 | Thielecke et al. | 375/299 |
| 2004/0146018 A1* | 7/2004 | Walton et al. | 370/329 |
| 2005/0078761 A1* | 4/2005 | Hottinen et al. | 375/267 |

FOREIGN PATENT DOCUMENTS

| | | |
|---|---|---|
| JP | 2001-103041 A | 4/2001 |
| JP | 2003-078480 A | 3/2003 |
| JP | 2004-056569 A | 2/2004 |
| JP | 2004-248075 A | 9/2004 |

OTHER PUBLICATIONS

Y. Teng et al., "Performance Analysis of SDM-OFDM System with Adaptive Modulation Method over MIMO Channels," The Institute of of Electronics, Information and Communication Engineers, vol. 103:66, May 23, 2003; pp. 75-82.

* cited by examiner

TRANSMITTER APPARATUS, RECEIVER APPARATUS, AND RADIO COMMUNICATION SYSTEM

TECHNICAL FIELD

The present invention relates to a radio communication system for transmitting/receiving data in a parallel manner between a transmitter apparatus having a plurality of antennas and a receiver apparatus having a plurality of antennas.

BACKGROUND ART

Figure 1:
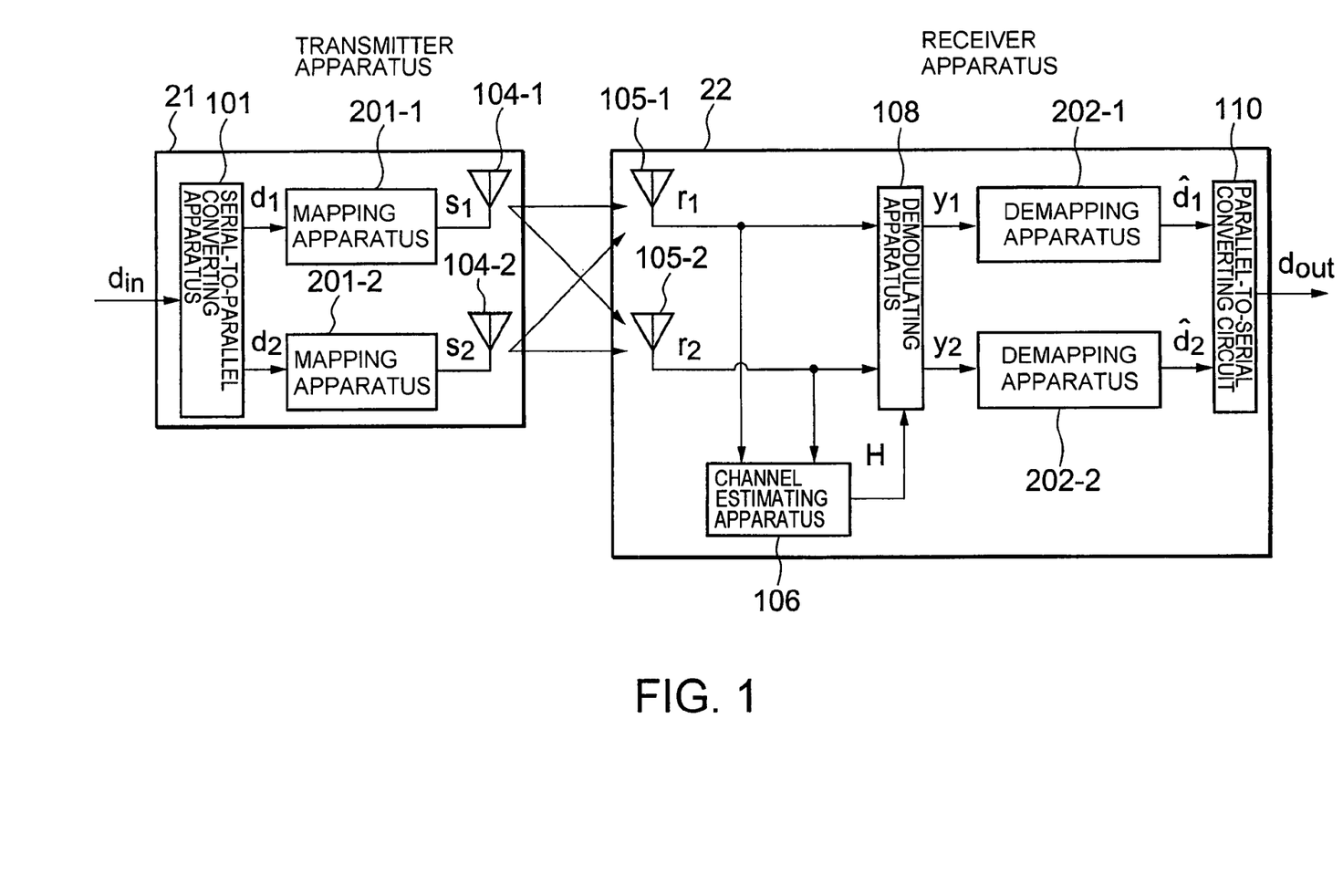
FIG. 1 is a block diagram for showing the arrangement of the conventional radio communication system.

Referring now to FIG. 1, a description is made of a conventional radio communication system. The illustrated radio communication system comprises a transmitter apparatus 21 having a plurality of antennas and a receiver apparatus 22 having a plurality of antennas. In the example being illustrated, the transmitter apparatus 21 has two antennas while the receiver apparatus 22 has two antennas.

The transmitter apparatus 21 comprises a serial-to-parallel converting apparatus 101, first and second mapping apparatuses 201-1 and 201-2, and first and second transmitter antennas 104-1 and 104-2. Two sets of the mapping apparatuses are employed in correspondence with the transmitter antennas.

Supplied to the transmitter apparatus 21, an input signal $d_{in}$ of a bit stream enters the serial-to-parallel converting apparatus 101. The serial-to-parallel converting apparatus 101 converts the input signal $d_{in}$ into first and second parallel signals $d_1$ and $d_2$ which correspond to the number of the transmitter antennas.

The first and second parallel signals $d_1$ and $d_2$ enter the first and second mapping apparatuses 201-1 and 201-2, respectively. In the case that, for example, a 4-value PSK is employed as a modulation level, the first and second mapping apparatuses 201-1 and 201-2 allocate 1 symbol for every 2 bits of the first and second parallel signals ($d_1$, $d_2$). The first and second mapping apparatuses 201-1 and 201-2 convert the first and second parallel signals $d_1$ and $d_2$ into first and second transmission signals $s_1$ and $s_2$, respectively.

The first and second transmission signals $s_1$ and $s_2$ are transmitted via the first and second transmitter antennas 104-1 and 104-2 to the receiver apparatus 22.

The receiver apparatus 22 comprises first and second receiver antennas 105-1 and 105-2, a channel estimating apparatus 106, a demodulating apparatus 108, first and second demapping apparatuses 202-1 and 202-2, and a parallel-to-serial converting apparatus 110. Two sets of the demapping apparatuses are employed in correspondence with the transmitter antennas.

Received in the first and second receiver antennas 105-1 and 105-2, first and second received signals $r_1$ and $r_2$ constitute synthesized waves of the first and second transmission signals $s_1$ and $s_2$.

The channel estimating apparatus 106 calculates a channel matrix H by using a signal which is referred to as, for example, a pilot signal and which is known with respect to both the transmitter apparatus 21 and the receiver apparatus 22. The pilot signal is transmitted from the transmitter apparatus 21 to the receiver apparatus 22 independent from the first and second transmission signals $s_1$ and $s_2$. The channel matrix H corresponds to a matrix which is expressed by the below-mentioned formula 1, and this channel matrix H causes the first and second received signals $r_1$ and $r_2$ to be related to the first and second transmission signals $s_1$ and $s_2$.

$$r = \begin{pmatrix} r_1 \\ r_2 \end{pmatrix} \qquad (1)$$
$$= \begin{pmatrix} h_{11} & h_{12} \\ h_{21} & h_{22} \end{pmatrix} \begin{pmatrix} s_1 \\ s_2 \end{pmatrix} + \begin{pmatrix} n_1 \\ n_2 \end{pmatrix}$$
$$= Hs + n$$

It should be noted that symbols $n_1$ and $n_2$ indicate first and second noise signals which are added to the first and second received signals $r_1$ and $r_2$, respectively.

The channel estimating apparatus 106 calculates the channel matrix H based upon the pilot signal transmitted by the transmitter apparatus 21 and this pilot signal received by the receiver apparatus 22 while the pilot signal is known by also the receiver apparatus 22.

The first and second received signals $r_1$ and $r_2$ enter the demodulating apparatus 108. The demodulating apparatus 108 receives the channel matrix H from the channel estimating apparatus 106, and obtains first and second demodulated signals $y_1$ and $y_2$ by using an inverse matrix $H^{-1}$ of the channel matrix H in accordance with the below-mentioned formula 2.

$$y = \begin{pmatrix} y_1 \\ y_2 \end{pmatrix} \qquad (2)$$
$$= H^{-1} r$$
$$= s + H^{-1} n$$
$$= \begin{pmatrix} s_1 \\ s_2 \end{pmatrix} + \frac{1}{|H|} \begin{pmatrix} h_{22} & -h_{12} \\ -h_{21} & h_{11} \end{pmatrix} \begin{pmatrix} n_1 \\ n_2 \end{pmatrix}$$
$$= \begin{pmatrix} s_1 \\ s_2 \end{pmatrix} + \frac{1}{h_{11}h_{22} - h_{12}h_{21}} \begin{pmatrix} h_{22}n_1 - h_{12}n_2 \\ -h_{21}n_1 + h_{11}n_2 \end{pmatrix}$$

It should also be noted that although matrix elements $h_{nm}$ (n=1, 2; m=1, 2) of the channel matrix H are dynamically varied over time, if such a case can be regarded in which a correlation among the matrix elements is sufficiently low and these matrix elements are independently varied, then it is known that the inverse matrix $H^{-1}$ is present. When the inverse matrix $H^{-1}$ is present, the demodulation can be carried out by the above-explained method.

The first and second demodulated signals $y_1$ and $y_2$ enter the first and second demapping apparatuses 202-1 and 202-2, respectively. The first and second demapping apparatuses 202-1 and 202-2 convert the first and second demodulated signals y1 and y2 into first and second reproduced parallel signals "$\hat{d}_1$" and "$\hat{d}_2$" of bit streams respectively in accordance with sequential operations which are completely reversed with respect to those of the first and second mapping apparatuses 201-1 and 201-2. That is, for instance, in such a case that a 4-value PSK is employed as a modulation multi-value number, the demodulated signals ($y_1$, $y_2$) of 1 symbol are converted into reproduced parallel signals of 2 bits.

The first and second reproduced parallel signals "$\hat{d}_1$" and "$\hat{d}_2$" enter the parallel-to-serial converting apparatus 110. The parallel-to-serial converting apparatus 110 converts the first and second reproduced parallel signals "$\hat{d}_1$" and "$\hat{d}_2$" into an output signal $d_{out}$, which is produced from the receiver apparatus 22.

On the other hand, in the above-explained conventional radio system, signal-to-noise ratios (SNR) "$\gamma_1$" and "$\gamma_2$" of the first and second demodulated signals $y_1$ and $y_2$ are expressed by the below-mentioned formula 3 and formula 4, respectively.

$$\gamma_1 = \frac{|s_1|^2 |h_{11}h_{22} - h_{12}h_{21}|^2}{\sigma_1^2(|h_{22}|^2 + |h_{12}|^2)} \quad (3)$$

$$\gamma_2 = \frac{|s_2|^2 |h_{11}h_{22} - h_{12}h_{21}|^2}{\sigma_2^2(|h_{21}|^2 + |h_{11}|^2)} \quad (4)$$

It should be noted that $\sigma_1^2$ and $\sigma_2^2$ denote the noise power. In addition, the noise power $\sigma^2$ may be calculated by using the below-mentioned formula 5 by using K pieces of sampling time, assuming now that a demodulated signal as a function of time is equal to y(t) (suffix letter is omitted, and omission of suffix letter is repeated in below-mentioned symbols).

$$\sigma^2 = \frac{1}{K}\sum_{t=1}^{K}\left\{y(t) - \frac{1}{K}\sum_{t'=1}^{K}y(t')\right\}^2 \quad (5)$$

The right side of the above-described formula 5 originally corresponds to an amount indicative of a sum of interference power and noise power. However, in the above-explained conventional radio communication system, the first and second demodulated signals $y_1$ and $y_2$ are demodulated by using the inverse matrix $H^{-1}$ of the channel matrix H, and thus, an interference signal component is not present in the first and second demodulated signals $y_1$ and $y_2$, as indicated by the above-described formula 2. This reason is given as follows: That is, the first demodulated signal $y_1$ of the above-described formula 2 does not depend upon the second transmission signal $s_2$, and the second demodulated signal $y_2$ does not depend upon the first transmission signal $s_1$. As a consequence, the right side of the above-described formula 5 becomes equal to the noise power $\sigma^2$.

As previously explained, if both the first and second demodulated signals $y_1$ and $y_2$ are measured, and are applied to the above-described formula 5, then both the first and second noise power $\sigma_1^2$ and $\sigma_2^2$ may be obtained. However, generally speaking, the noise power $\sigma^2$ may be substantially determined based upon a noise signal which is produced in an amplifier contained in the receiver antenna 105. As a consequence, in a case that the same type of receiver antennas and the same type of amplifiers are employed in the same environment, it is possible to regard that the first noise power $\sigma_1^2$ of the first demodulated signal $y_1$ is equal to the second noise power $\sigma_2^2$ of the second demodulated signal $y_2$ ($\sigma_1^2 = \sigma_2^2$). In addition, inasmuch as noise power $\sigma^2$ is not so closely associated with a temporal change, if the noise power $\sigma^2$ is once calculated, then this calculated noise power may be employed as a known value ($\sigma_1^2 = \sigma_2^2 = $const.).

In addition, squared temporal averages $|s_1|^2$ and $|s_2|^2$ of the first and second transmission, signals correspond to the known values in a radio communication system, and further, equal to each other ($|s_1|^2 = |s_2|^2 = $const.).

When the channel matrix H is calculated by the above-described method in the above-described conventional radio communication system, first and second SNRs $\gamma_1$ and $\gamma_2$ of the first and second demodulated signals $y_1$ and $y_2$ can be calculated.

Now, it is assumed that the matrix elements $h_{nm}$ (n=1, 2; m=1, 2) of the channel matrix H, which are dynamically varied, become such values capable of satisfying, for example, $|h_{22}|^2 + |h_{12}|^2 = 2(|h_{21}|^2 + |h_{11}|^2)$. In this case, the SNR values become $\gamma_2 = 2\gamma_1$. Thus, it can be seen that the SNR value of the second demodulated signal $y_2$ is 2 times larger than the SNR value of the first demodulated signal $y_1$. In this case, when the SNR value of the first demodulated signal $y_1$ is equal to a predetermined value, the SNR value of the second demodulated signal $y_2$ becomes excessive, which does not give merit in view of such a technical point that information is effectively transmitted. In order to transmit the information in an effective manner, a transmission parameter such as a modulation level is adaptively controlled, and thus, the excessively large SNR value is utilized so as to increase the transmission speed, which may give merit.

Among the conventional techniques, several techniques have been involved which control transmission parameters based upon physical amounts used to estimate line qualities, that are typified by SNRs or the like. For instance, in radio communication systems arranged by a transmitter apparatus having a single antenna and a receiver apparatus having a single antenna, such techniques for controlling transmission parameters based upon physical amounts such as a code error rate have been disclosed (see Japanese Laid-open Patent Application No. Sho-57-155856, and Japanese Laid-open Patent Application No. 2001-103041). In addition, another technique has been disclosed in which a single receiver apparatus for communicating with a transmitter apparatus having a plurality of antennas which transmit the same signals exclusively selects the antenna of the transmitter apparatus based upon a line quality (see Japanese Laid-open Patent Application No. 2003-78480).

However, in such a radio communication system for transmitting/receiving data in a parallel manner between a transmitter apparatus having a plurality of antennas and a receiver apparatus having a plurality of antennas, a technique capable of controlling a transmission parameter based upon a line quality has not yet been proposed, while the present invention is directed to the above-explained radio communication system.

An object of the present invention is to provide a radio communication system arranged by a transmitter apparatus having a plurality of antennas and a receiver apparatus having a plurality of antennas, which transmits and receives data in a parallel manner and which controls a transmission parameter based upon a line quality.

DISCLOSURE OF INVENTION

In the present invention, a receiver apparatus measures demodulated signals so as to calculate a physical amount with respect to each of signal series. The physical amount is used to estimate such a radio line quality as an SINR (ratio of signal power to sum of interference power and noise power). Then, based upon this physical amount, the receiver apparatus determines a transmission parameter with respect to each of the signal series, and feeds back the determined transmission parameter to a transmitter apparatus. The transfer parameter is used when the transmitter apparatus controls the transmission operation. The transmitter apparatus controls the transmission operation with respect to each of the signal series based upon this transmission parameter.

It should be rioted that in such a case that the receiver apparatus estimates a channel matrix for causing transmission signals transmitted by the transmitter apparatus in a parallel manner to be related to received signals received by the receiver apparatus, and demodulates the received signals based upon the estimated channel matrix, the physical amount used to estimate the radio line quality can be calculated only by this estimated channel matrix.

For instance, SNRs (ratio of signal power to noise power) of demodulated signals may be calculated only by a channel matrix. In the case that a demodulating operation is carried out based upon the channel matrix, since no interference signal component is contained in the demodulated signals, the SNRs of the demodulated signals are equal to the SINRs thereof.

Furthermore, in the case that a demodulating operation is carried out based upon the channel matrix, if it is assumed that a plurality of transmitter antennas separately transmit signals, a sum of SNRs of signals which are detected by a plurality of receiver antennas respectively may be regarded as either SNRs or SINRs of the demodulated signals. This amount may also be calculated only by the channel matrix.

In accordance with the present invention equipped with such an arrangement, in the system for transmitting/receiving data in the parallel manner between the transmitter apparatus having the plurality of antennas and the receiver apparatus having the plurality of antennas, a transmission operation can be effectively realized in response to line qualities.

BEST MODE FOR CARRYING OUT THE INVENTION

Now, embodiments of the present invention will now be described in detail with reference to drawings.

First Embodiment

Figure 2:
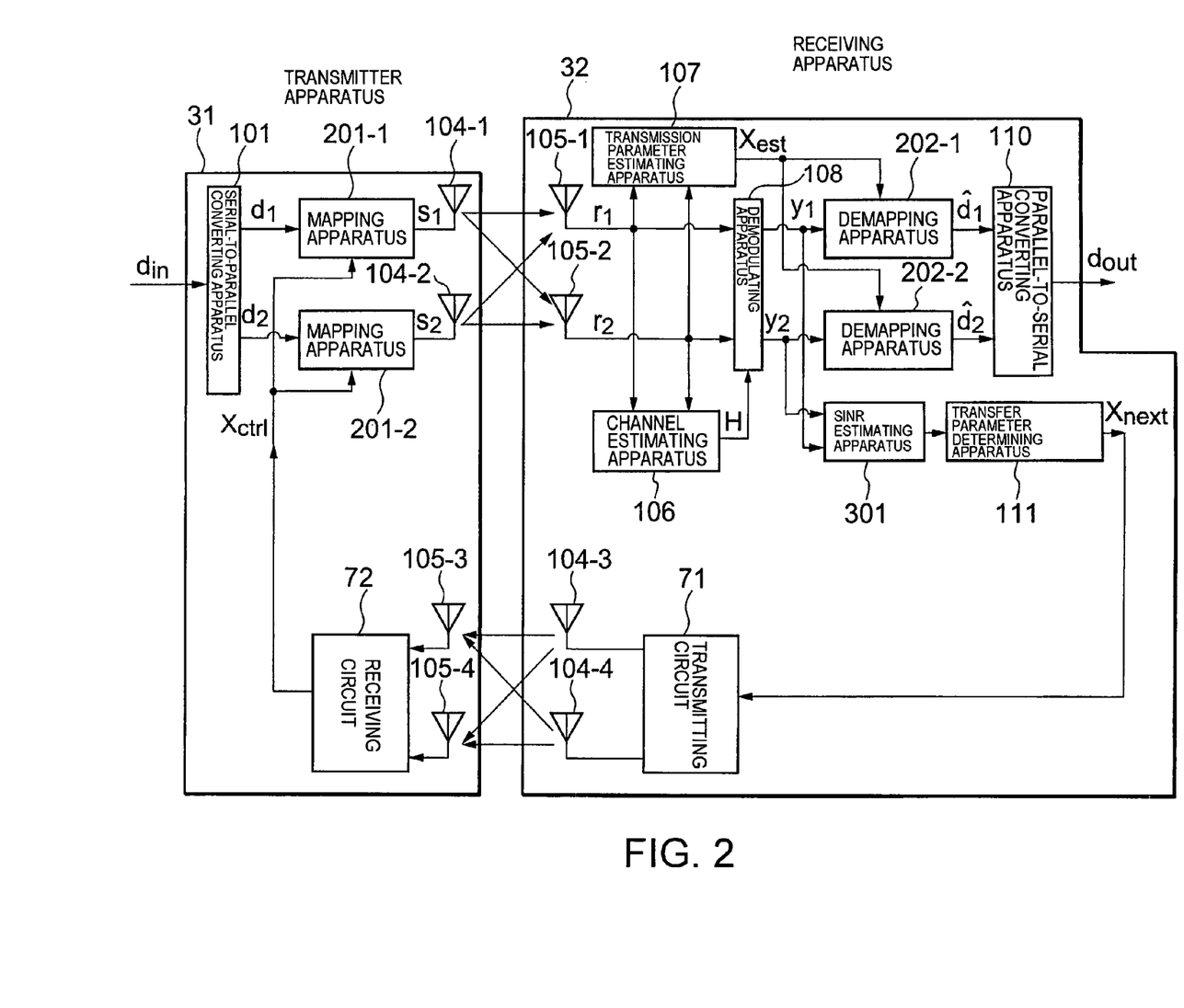
FIG. 2 is a block diagram for indicating an arrangement of a radio communication system according to a first embodiment of the present invention.

Referring now to FIG. 2, a description is made of a radio communication system according to a first embodiment of the present invention. The illustrated radio communication system comprises a transmitter apparatus 31 having a plurality of antennas, and a receiver apparatus 32 having a plurality of antennas. In the example being illustrated, the transmitter apparatus 31 has two antennas while the receiver apparatus 32 has two antennas.

The transmitter apparatus 31 comprises a serial-to-parallel converting apparatus 101, first and second mapping apparatuses 201-1 and 201-2, and first and second transmitter antennas 104-1 and 104-2. Two sets of the mapping apparatuses are employed in correspondence with the transmitter antennas.

The transmitter apparatus 31 is similar to the conventional transmitter apparatus 21 illustrated in FIG. 1 except for one technical point which will later be described. This technical point is given as follows; That is, the first and second mapping apparatuses 201-1 and 201-2 receive a transmission parameter control signal $X_{ctrl}$ from the receiver apparatus 32, and adaptively control a modulation level corresponding to a transmission parameter based upon the transmission parameter control signal $X_{ctrl}$. To this end, the transmitter apparatus 31 comprises two sets of receiver antennas 105-3 and 105-4, and a receiving circuit 72.

It is assumed that the first and second mapping apparatuses 201-1 and 201-2 have allocated one symbol for every 2 bits of first and second parallel signals $(d_1, d_2)$ by using, for instance, 4-value PSK, and the first and second mapping apparatuses 201-1 and 201-2 have converted the first and second parallel signals $d_1$ and $d_2$ into first and second transmission signals $s_1$ and $s_2$, respectively. In this case, the above-described operation is changed as follows: Both the first and second mapping apparatuses 201-1 and 201-2 allocate one symbol for every 3 bits of the first and second parallel signals $(d_1, d_2)$ by using, for example, 8-value PSK based upon the transmission parameter control signal $X_{ctrl}$ received by the receiving circuit 72, and convert the first and second parallel signals $d_1$ and $d_2$ into the first and second transmission signals $s_1$ and $s_2$, respectively.

This transmission parameter control signal $X_{ctrl}$ corresponds to a control signal produced by feeding back a subsequent transmission parameter control signal $X_{next}$ equal to an output signal from a transmission parameter determining apparatus 111 of the receiver apparatus 32. The feedback is carried out by containing the next transmission parameter control signal $X_{next}$ in either a main signal or a control signal of a signal which is transmitted from, for example, the receiver apparatus 32 toward the transmitter apparatus 31. To this end, the receiver apparatus 32 comprises a transmitting circuit 71, and two sets of transmission antennas 104-3 and 104-4.

The receiver apparatus 32 comprises a receiver antenna 105, a channel estimating apparatus 106, a transfer parameter estimating apparatus 107, a demodulating apparatus 108, first and second demapping apparatuses 202-1 and 202-2, a parallel-to-serial converting apparatus 110, an SINR estimating apparatus 301, and a transfer parameter determining apparatus 111. Two sets of the demapping apparatuses are provided in correspondence with the transmitter antennas.

The receiver apparatus 32 is arranged in such a manner that the transmission parameter estimating apparatus 107, the SINR estimating apparatus 301, and the transmission parameter determining apparatus 111 have been newly added with respect to the receiver apparatus 22 of the conventional art illustrated in FIG. 1. Further, the following different technical point is present. That is, the first and second demapping apparatuses 202-1 and 202-2 receive a transmission parameter estimated signal $X_{est}$ from the transfer parameter estimating apparatus 107, and convert the first and second demodulated signals $y_1$ and $y_2$ into reproduced parallel signals based upon this transmission parameter estimated signal $X_{est}$. Other structural portions of the receiver apparatus 32 are similar to those of the receiver apparatus 22 of the conventional art illustrated in FIG. 1.

The transmission parameter estimating apparatus 107 estimates a transmission parameter based upon the first and second received signals $r_1$ and $r_2$. In this embodiment, a modulation level is estimated. The transmission parameter may be obtained by such a way that, for example, a control signal belonging to a main signal is demodulated, or the transmission parameter may be estimated from the waveforms of the first and second received signals $r_1$ and $r_2$. The reason why the transmission parameter estimating apparatus is required in the present invention is given as follows: That is, since the transmission parameter is adaptively changed on the side of the transmitter apparatus, the changed transmission parameter is required to be known on the side of the receiver apparatus for performing either the demapping operation or the decoding operation.

The first and second demapping apparatuses 202-1 and 202-2 receive the transmission parameter estimated signal $X_{est}$ from the transmission parameter estimating apparatus 107, and converts the first and second modulated signals $y_1$ and $y_2$ into reproduced parallel signals based upon this transmission parameter estimated signal $X_{est}$. For instance, it is assumed that the transmission parameter estimated signal $X_{est}$ suggests a use of 8-value PSK. In this assumption case, the first and second demodulated signals $y_1$ and $y_2$ are converted into the reproduced parallel signals in such a manner that the first and second demodulated signals ($y_1$, $y_2$) of 1 symbol become 3-bit reproduced parallel signals.

The SINR estimating apparatus 301 calculates a ratio (SINR) of signal power to a sum of interference power and noise power based upon the first and second modulated signals $y_1$ and $y_2$, and transmits the calculated SINR to the transmission parameter determining apparatus 111. The SINR may be expressed by the below-mentioned formula 6 by using K pieces of sampling times, assuming now that a demodulated signal as a function of time is equal to y(t) (suffix letter is omitted. This omission is similarly applied to below-mentioned demodulated signal).

$$\text{SINR} = \left\{ \frac{1}{K} \sum_{t=1}^{K} y(t) \right\}^2 \bigg/ \frac{1}{K} \sum_{t=1}^{K} \left\{ y(t) - \frac{1}{K} \sum_{t'=1}^{K} y(t') \right\}^2 \quad (6)$$

The SINR estimating apparatus 301 calculates this SINR as to the first and second demodulated signals $y_1$ and $y_2$.

It should be understood that in this embodiment, inasmuch as the first and second demodulated signals $y_1$ and $y_2$ are demodulated by using the inverse matrix $H^{-1}$ of the channel matrix H, as indicated by the above-explained formula 2, an interference signal component is not present in both the first and second demodulated signals $y_1$ and $y_2$ (namely, first demodulated signals $y_1$ of above-explained formula 2 does not depend on second transmission signal $s_2$, and second demodulated signal $y_2$ does not depend upon first transmission signal $s_1$). As a consequence, In the case of this embodiment, the SINR calculated by the above-described formula 6 may become equal to the SNR. Apparently, in the case that an SINR is calculated based upon other demodulation methods (for instance, Maximum-Likelihood series estimating method, interference canceller etc.), the calculated SINR is not always equal to an SNR.

The transmission parameter determining apparatus 111 receives the SINRs as to the first and second demodulated signals $y_1$ and $y_2$ from the SINR estimating apparatus 301, and determines a transmission parameter in the next transmission operation based upon the received SINRs, and then produces a next transmission parameter control signal $X_{next}$. This next transmission parameter control signal $X_{next}$ is transmitted from the transmitting circuit 71 via the two transmission antennas 104-1 and 104-2 to the transmitter apparatus 31.

Normally, in a radio communication, slot-processing operation or frame-processing operation is carried out in order to estimate a channel and to transmit a control signal. Also, a transmission parameter is controlled for every single slot or single frame, otherwise, for every plural slots or plural frames. As a result, "next" indicates a next single (plural) frame, or a next single (plural) slot.

As previously explained, the next transmission parameter control signal $X_{next}$ is fed back to the transmitter apparatus 31 (namely, is received via two receiver antennas 105-3 and 105-4 to receiving circuit 72), and is supplied as the transmission parameter control signal $X_{ctrl}$ to both the first and second mapping apparatus 201-1 and 201-2.

Next, operations of the transmission parameter determining apparatus 111 will now be explained by employing a concrete example.

Figure 3:
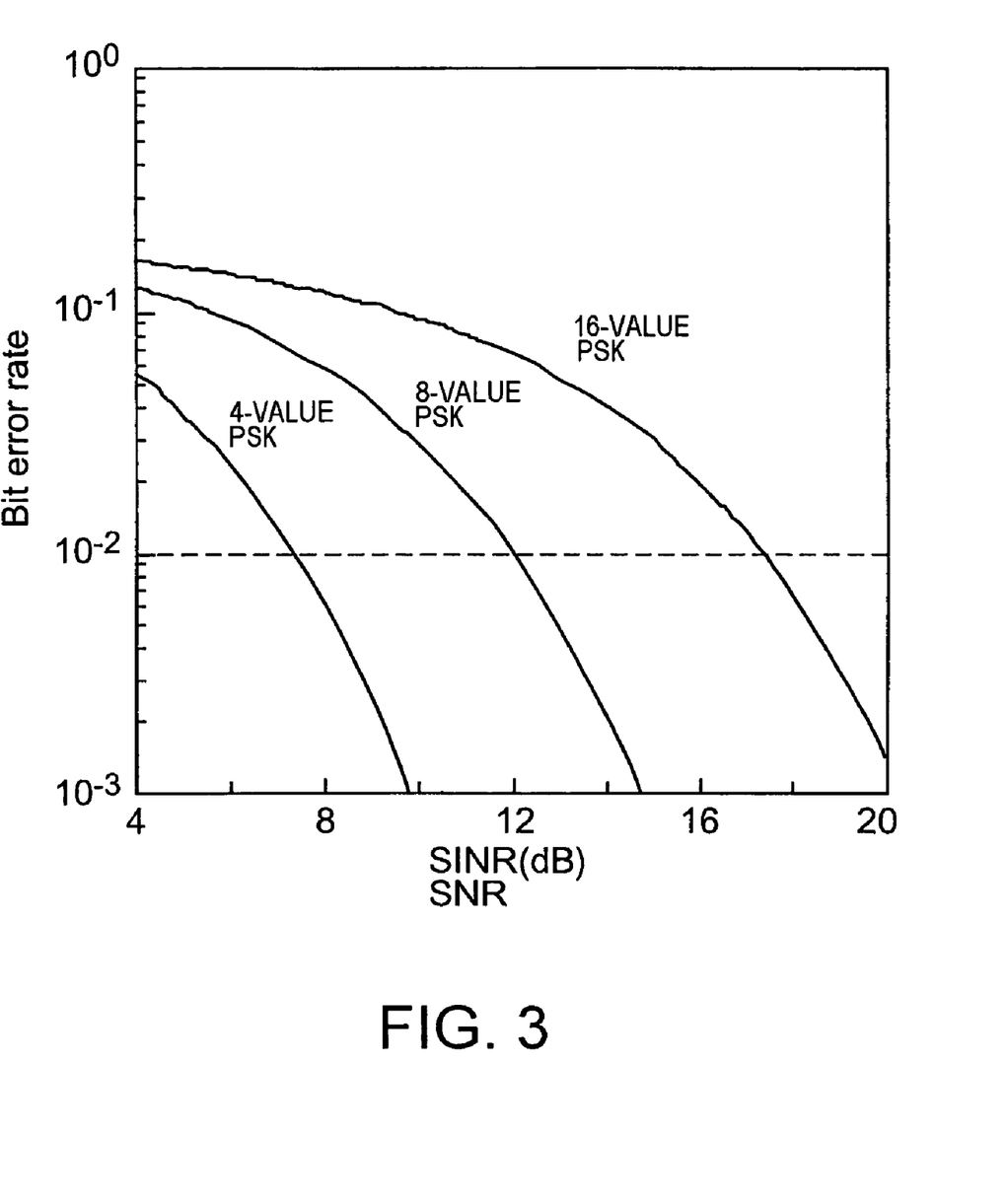
FIG. 3 is a graph for representing bit error rates in the case that 4-value PSK, 8-value PSK, and 16-value PSK are employed.

It is assumed that both the modulation level of the first and second transmission signals $s_1$ and $s_2$ correspond to the 4-value PSKs, the SINR of the first demodulated signal $y_1$ calculated by the SINR estimating apparatus 301 corresponds to 7.4 dB, and the SINR of the second demodulated signal $y_2$ calculated by the SINR estimating apparatus 301 corresponds to 17.4 dB. In this case, assuming now that a predetermined line quality is a bit error rate of 1%, as seen from FIG. 3, the 4-value PSK is suitable for respect to the first transmission signal $s_1$, whereas the 16-value PSK may be applied with respect to the second transmission signal $s_2$. Accordingly, the transmission parameter determining apparatus 111 produces the next transmission parameter control signal $X_{next}$ which designates that the 4-value PSK and the 16-value PSK are used with respect to the first and second transmission signals $s_1$ and $s_2$.

With employment of the above-described operation, 2 bits of data per 1 symbol can be transmitted In the first transmission signal $s_1$, and 4 bits of data per 1 symbol can be transmitted in the second transmission signal $s_2$. Accordingly, while the required line quality can be satisfied, the effective transmission operation can be realized, as compared with such a case that the first and second transmission signals $s_1$ and $s_2$ are fixed to the 4-value PSK.

Second Embodiment

Figure 4:
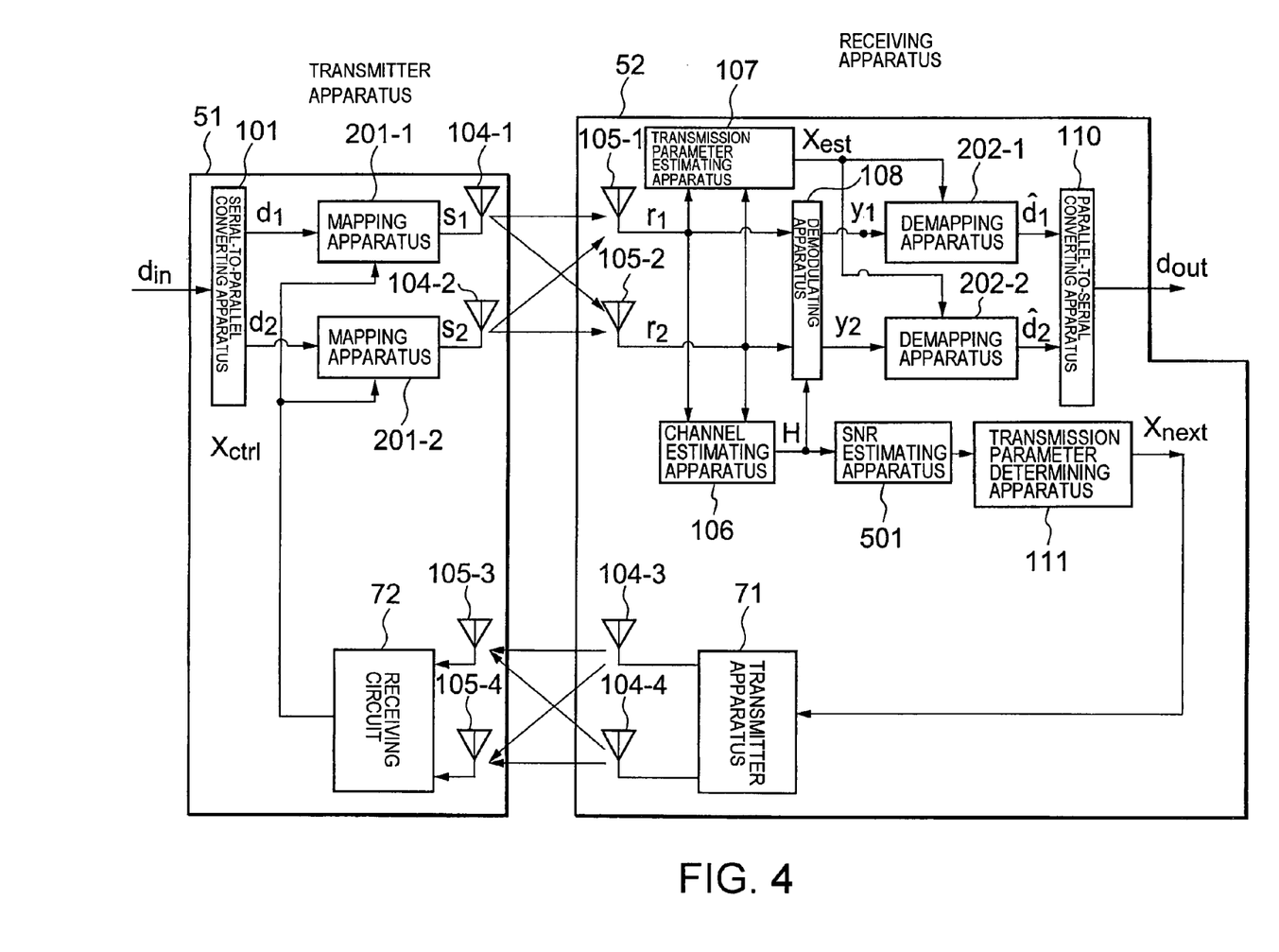
FIG. 4 is a block diagram for showing an arrangement of a radio communication system according to a second embodiment of the present invention.

Referring now to FIG. 4, a description is made of a radio communication system according to a second embodiment of the present invention. The illustrated radio communication system comprises a transmitter apparatus 51 having a plurality of antennas, and a receiver apparatus 52 having a plurality of antennas. In the example being illustrated, the transmitter apparatus 51 has two antennas while the receiver apparatus 52 has two antennas.

The transmitter apparatus 51 is similar to the transmitter apparatus 31 of the first embodiment of FIG. 2.

The receiver apparatus 52 has such a different point that an SNR estimating apparatus 501 is provided instead of the SINR estimating apparatus 301, as compared with the receiver apparatus 32 of the first embodiment of FIG. 2.

The SNR estimating apparatus 501 is not supplied with such first and second demodulated signals $y_1$ and $y_2$ as explained in the SINR estimating apparatus 301, but is supplied with a channel matrix H so as to calculate an SNR. This channel matrix H corresponds to an output of the channel estimating apparatus 106.

Originally, as a physical amount used to estimate a line quality, an SINR is preferably used. However, as previously explained, in the demodulating process operation by the inverse matrix $H^{-1}$ of the channel matrix H, the interference signal component is not present in both the first and second demodulated signals $y_1$ and $y_2$ (namely, first demodulates signal $y_1$ of above-explained formula 2 does not depend on second transmission signal $s_2$, and second demodulated signal $y_2$ does not depend upon first transmission signal $s_1$), so that the SINR may become equal to the SNR.

The SNR estimating apparatus 501 calculates SNRs of the first and second demodulated signals $y_1$ and $y_2$ from the channel matrix H based upon the above-described formula 3 and the above-explained formula 4 (as previously explained, $\sigma_1^2=\sigma_2^2$=const., $|s_1|^2=|s_2|^2$=const., all of values are known). The calculated SNRs are transmitted to the transmission parameter determining apparatus 111.

Next, operations as to the transmission parameter determining apparatus 111 will now be explained by employing a concrete example.

For instance, when a channel matrix H corresponding to $|h_{11}|^2=1$, $|h_{12}|^2=0.5$, $|h_{21}|^2=2$, and $|h_{22}|^2=0.5$ is estimated by the channel estimating apparatus 106, and then, the SNR estimating apparatus 501 calculates SNRs based upon these estimated values, the calculated SNRs become $\gamma_1=3\gamma_2$. In this case, assuming now that the second SNR $\gamma_2$ is equal to 7.4 dB, the first SNR $\gamma_2$ becomes nearly equal to 12.1 dB. As apparent from FIG. 3, in order to obtain a bit error rate of 1% which corresponds to the line quality in the 4-value PSK, it can be understood that an SNR of 7.4 dB may be satisfied. As a consequence, in the case that a desirable line quality is a bit error rate of 1%, as to the second transmission signal $s_2$, the 4-value PSK is appropriate. However, in the case that the 8-value PSK is used, inasmuch as the bit error rate of 1% corresponding to the line quality may be realized by an SNR of 12 dB, even if the 8-value PSK is used with respect to the first transmission signal $s_1$, then it can be seen that the 8-value PSK can satisfy the desirable line quality. To this end, the transmission parameter determining apparatus 111 produces such a next transmission parameter control signal $X_{next}$ that the 8-value PSK is used as the first transmission signal $s_1$ and the 4-value PSK is used as the second transmission signal $s_2$ as the next transfer parameters. The transmitter apparatus 51 transmits the first transmission signal $s_1$ by the 8-value PSK and transmits the second transmission signal $s_2$ by the 4-value PSK in the next transmission operation. As a result, a high-speed signal transmission operation can be expected, as compared with such a case that the 4-value PSK is continuously employed for both the first and second transmission signals $s_1$ and $s_2$.

Third Embodiment

Figure 5:
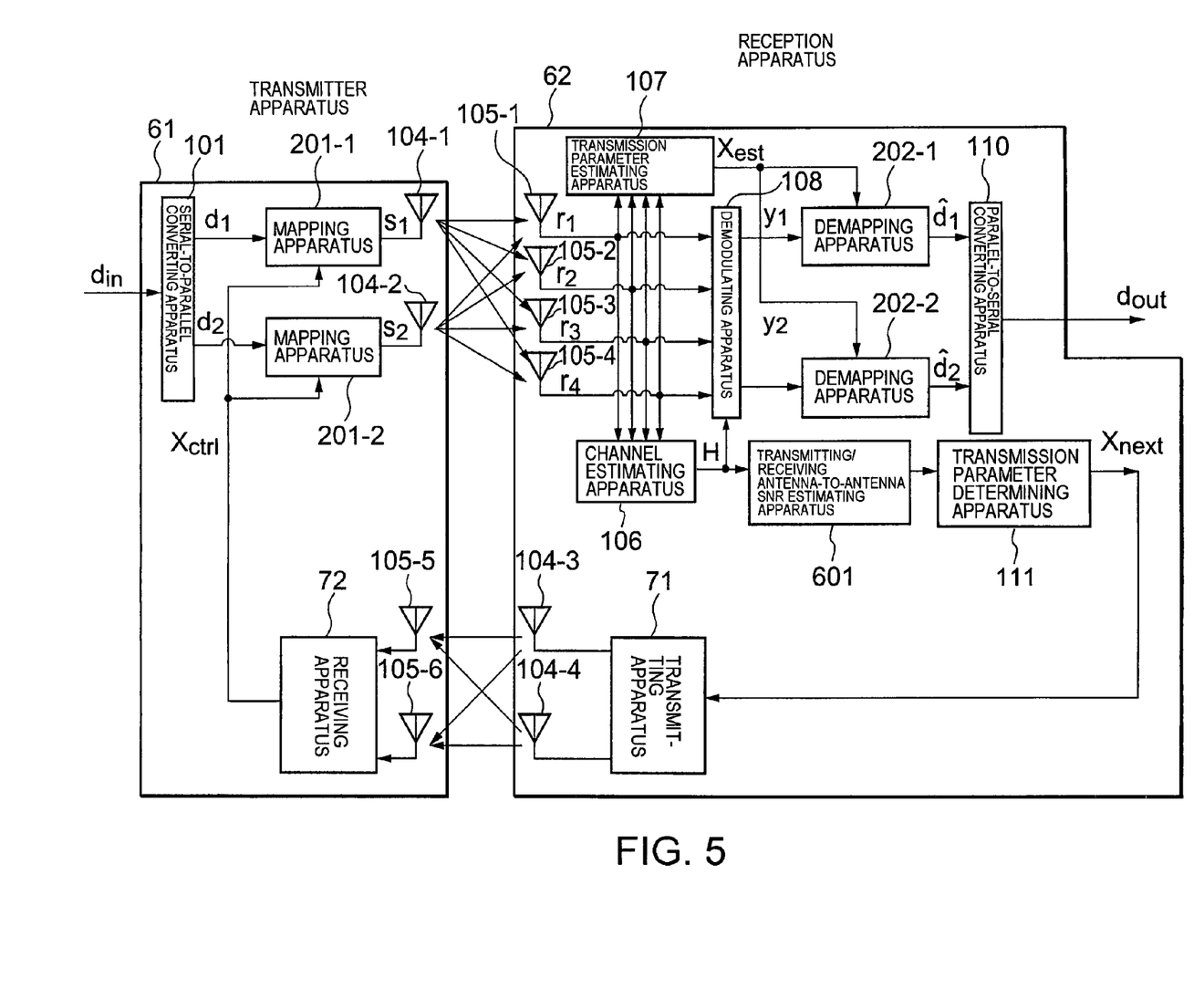
FIG. 5 is a block diagram for indicating an arrangement of a radio communication system according to a third embodiment of the present invention.

Referring now to FIG. 5, a description is made of a radio communication system according to a third embodiment of the present invention. The illustrated radio communication system comprises a transmitter apparatus 61 having a plurality of antennas, and a receiver apparatus 62 having a plurality of antennas. In the example being illustrated, the transmitter apparatus 61 has two antennas while the receiver apparatus 62 has four antennas.

The transmitter apparatus 61 is similar to the transmitter apparatus 31 of the first embodiment of FIG. 2, and the transmitter apparatus 51 of the second embodiment of FIG. 4.

The receiver apparatus 62 has the below-mentioned two different points, as compared with either the receiver apparatus 32 of the first embodiment illustrated in FIG. 2 or the transmitter apparatus 52 of the second embodiment illustrated in FIG. 4.

One different point is due to a total number of the receiver antennas 105 being 4. The channel estimating apparatus 106 calculates a 4×2 channel matrix H indicated by the below-mentioned formula 7, and then, sends the calculated 4×2 channel matrix H to the demodulating apparatus 108.

$$r = \begin{pmatrix} r_1 \\ r_2 \\ r_3 \\ r_4 \end{pmatrix} \qquad (7)$$

$$= \begin{pmatrix} h_{11} & h_{12} \\ h_{21} & h_{22} \\ h_{31} & h_{32} \\ h_{41} & h_{42} \end{pmatrix} \begin{pmatrix} s_1 \\ s_2 \end{pmatrix} + \begin{pmatrix} n_1 \\ n_2 \\ n_3 \\ n_4 \end{pmatrix}$$

$$= Hs + n.$$

Also, as to this 4×2 channel matrix H, when it can be regarded that a correlation among the matrix elements is sufficiently low and these matrix elements are independently varied, while $H^H$ is defined as a complex conjugate transposed matrix of the channel matrix H, it is known such a fact that such a matrix (Moore-Penrose generalized inverse) as $H^+ = (H^H H)^{-1} H^H$ is present, and a demodulation by the below-mentioned method can be carried out.

The demodulating apparatus 108 obtains first and second demodulated signals $y_1$ and $y_2$ from first through fourth received signals $r_1, r_2, r_3, r_4$ by using this matrix $H^+$ as represented in the below-mentioned formula 8.

$$y = \begin{pmatrix} y_1 \\ y_2 \end{pmatrix} \qquad (8)$$

$$= H^+ r$$

$$= s + H^+ n$$

$$= \begin{pmatrix} s_1 \\ s_2 \end{pmatrix} + H^+ \begin{pmatrix} n_1 \\ n_2 \\ n_3 \\ n_4 \end{pmatrix}.$$

Another different point is given as follows: That is, a transmitting/receiving antenna-to-antenna SNR estimating apparatus 601 is provided instead of the SINR estimating apparatus 301 according to the first embodiment shown in FIG. 2, or the SNR estimating apparatus 501 according to the second embodiment shown in FIG. 4.

Similar to the SNR estimating apparatus 501 according to the second embodiment illustrated in FIG. 4, the transmitting/receiving antenna-to-antenna SNR estimating apparatus 601 receives a channel matrix H from the channel estimating apparatus 106. While this channel matrix H is used, the transmitting/receiving antenna-to-antenna SNR estimating apparatus 601 calculates SNRs of received signals based upon the below-mentioned formula 9 in such a conceivable case that the first to fourth receiver antennas 105-1 to 105-4 separately receive the first and second transmission signals $s_1$ and $s_2$.

$$\gamma_{nm} = \frac{|h_{nm}|^2 |s_m|^2}{\sigma_n^2} \quad (n=1,2,3,4; m=1,2). \tag{9}$$

In this example, it is assumed that an antenna for transmitting the first transmission signal $s_1$ corresponds to the first transmitter antenna 104-1, and an antenna for transmitting the second transmission signal $s_2$ corresponds to the second transmitter antenna 104-2. It is also assumed that an antenna for detecting the first received signal $y_1$ corresponds to the first receiver antenna 105-1, an antenna for detecting the second received signal $y_2$ corresponds to the second receiver antenna 105-2, an antenna for detecting the third received signal $y_3$ corresponds to the third receiver antenna 105-5, and an antenna for detecting the fourth received signal $y_4$ corresponds to the fourth receiver antenna 105-4. When the first transmitter antenna 104-1 transmits the first transmission signal $s_1$ and this first transmission signal $s_1$ is received by the first receiver antenna 105-1, an SNR of this received signal $r_1$ becomes $\gamma_{11}$, and when this first transmission signal $s_1$ is received by the second receiver antenna 105-2, an SNR of this received signal $r_2$ becomes $\gamma_{21}$. Also, when this first transmission signal $s_1$ is received by the third receiver antenna 105-3, an SNR of the received signal $r_3$ becomes $\gamma_{31}$, and when this first transmission signal $s_1$ is received by the fourth receiver antenna 105-4, an SNR of the received signal $r_4$ becomes $\gamma_{41}$. Further, when the second transmitter antenna 104-2 transmits the second transmission signal $s_2$ and this second transmission signal $s_2$ is received by the first receiver antenna 105-1, an SNR of this received signal $r_1$ becomes $\gamma_{12}$, and when this second transmission signal $s_2$ is received by the second receiver antenna 105-2, an SNR of this received signal $r_2$ becomes $\gamma_{22}$. Also, when this second transmission signal $s_2$ is received by the third receiver antenna 105-3, an SNR of the received signal $r_3$ becomes $\gamma_{32}$, and when this second transmission signal $s_2$ is received by the fourth receiver antenna 105-4, an SNR of the received signal $r_4$ becomes $\gamma_{42}$.

Also, as previously explained, inasmuch as $\sigma_1^2 = \sigma_2^2 = \sigma_3^2 = \sigma_4^2 = \text{const.}$, $|s_1|^2 = |s_2|^2 = \text{const.}$, and all of these values are known, if the channel matrix H can be obtained, then an SNR $\gamma_{nm}$ may be calculated.

The transmitting/receiving antenna-to-antenna SNR estimating apparatus 601 transmits the $\gamma_{nm}$ calculated in the above-described manner to the transmission parameter determining apparatus 111.

The transmission parameter determining apparatus 111 receives the SNR $\gamma_{nm}$ from the transmitting/receiving antenna-to-antenna SNR estimating apparatus 601. It is assumed that, for example, there are one relationship of $\gamma_{11} > \gamma_{21} > \gamma_{31} > \gamma_{41}$ and another relationship of $\gamma_{12} > \gamma_{22} > \gamma_{32} > \gamma_{42}$ in the received SNR $\gamma_{nm}$. In this case, for instance, two sets of the largest SNRs of each of both the first and second transmission signals $s_1$ and $s_2$ are selected, and then, such an SNR obtained by adding the selected two largest SNRs to each other is regarded as SNRs of the first and second demodulated signals $y_1$ and $y_2$. In other words, the SNR of the first demodulated signal $y_1$ becomes $\gamma_1 = \gamma_{11} + \gamma_{21}$, and the SNR of the second demodulated signal $y_2$ becomes $\gamma_2 = \gamma_{12} + \gamma_{22}$. Based upon the obtained SNR$\gamma_1$ and SNR$\gamma_2$, the transmission parameter determining apparatus 111 selects a proper transmission parameter, and produces the next transmission parameter control signal $X_{next}$ similar to the first embodiment and the second embodiment. As a result, a transmission operation in a higher efficiency can be expected.

Fourth Embodiment

Figure 6:
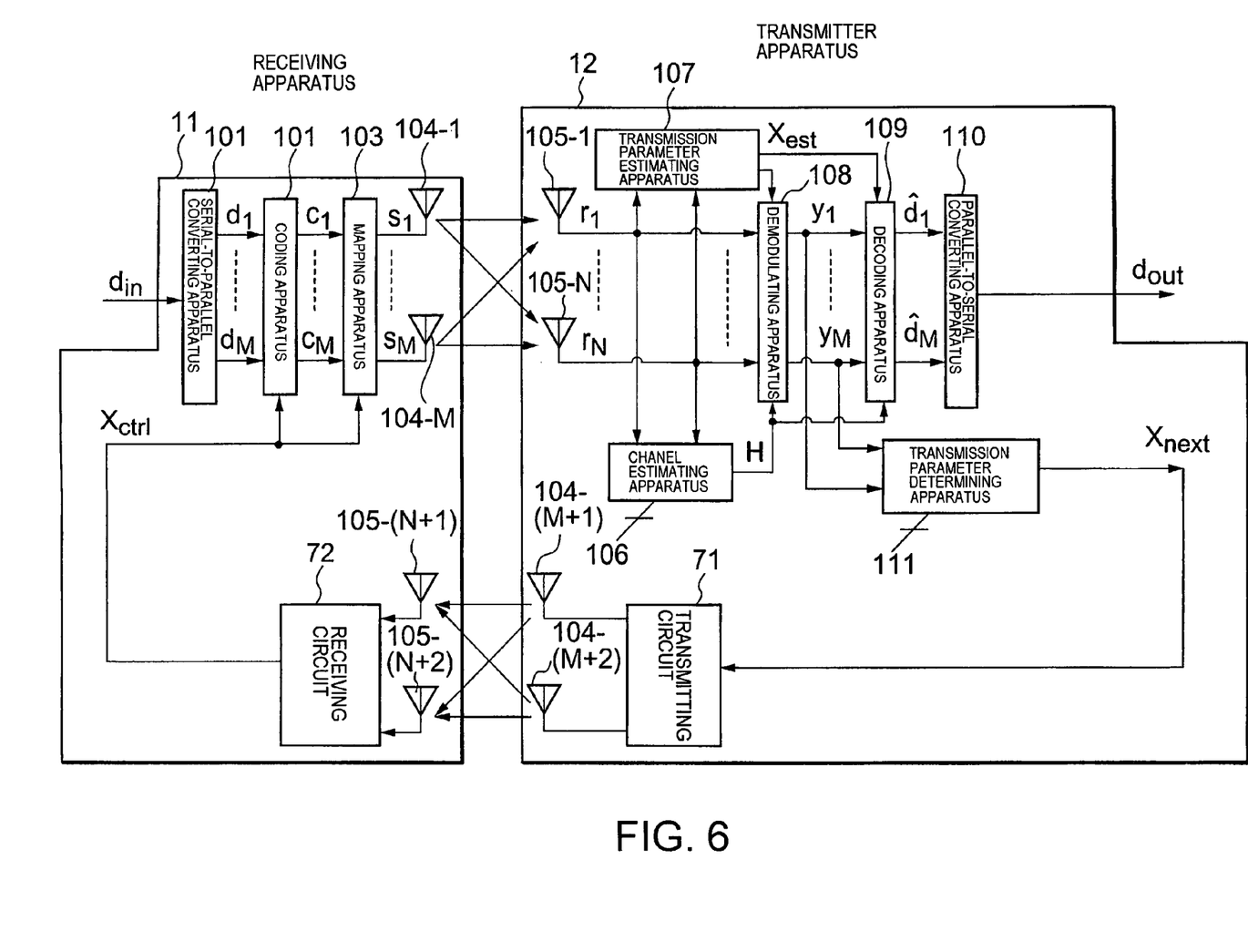
FIG. 6 is a block diagram for showing an arrangement of a radio communication system according to a fourth embodiment of the present invention.

Referring now to FIG. 6, a description is made of a radio communication system according to a fourth embodiment of the present invention. The illustrated radio communication system comprises a transmitter apparatus 11 having a plurality of antennas, and a receiver apparatus 12 having a plurality of antennas. In the example being illustrated, the transmitter apparatus 11 has M pieces of antennas, and the receiver apparatus 12 has N pieces of antennas.

This fourth embodiment corresponds to a generalized embodiment while the radio communication system according to the first embodiment illustrated in FIG. 2 is used as a base.

The radio communication system of this fourth embodiment has the below-mentioned different points, as compared with the radio communication system according to the first embodiment illustrated in FIG. 2. That is, the respective apparatus receive changes which are due to a change in numbers of antennas. A coding apparatus 102 is provided in the transmitter apparatus 11. Instead of the demapping apparatus 202, a decoding apparatus 109 is provided. The demodulating method of the demodulating apparatus 108 is generalized. A function capable of calculating a physical amount used to estimate a line quality is generalized, and this generalized function is employed in the transmission parameter determining apparatus 111, so that the SINR estimating apparatus 301 is omitted.

Next, the radio communication system according to this fourth embodiment will now be explained by paying attention to the above-described different points.

The serial-to-parallel converting apparatus 101 converts an input signal $d_{in}$ of a bit stream into first through M-th parallel signals $d_1$ through $d_M$, the total number of which are equal to a total number M of the transmitter antennas 104. The coding apparatus 102 receives a transmission parameter control signal $X_{ctrl}$, and error-correction-codes the first to M-th parallel signals $d_1$ to $d_M$ based upon this received transmission parameter control signal $X_{ctrl}$, and then, produces first through M-th error correction coded signals $c_1$ through $C_M$. At this time, the coding apparatus 102 controls the structures of the error correction codes and the coding ratio based upon the transmission parameter control signal $X_{ctrl}$.

The mapping apparatus 103 receives the transmission parameter control signal $X_{ctrl}$, and converts, based thereupon, the first through M-th error correction coded signals $c_1$ to $c_M$ into first through M-th transmission signals $s_1$ through $s_M$, respectively. For instance, in the case that the modulation multi-valued value is the 4-value PSK, the mapping apparatus 103 produces 1 symbol with respect to a 2-bit input. Also, in the case that the modulation multi-valued value is the 8-value PSK, the mapping apparatus 103 produces 1 symbol with respect to a 3-bit input. At this time, the mapping apparatus 103 controls these modulation levels based upon the transmission parameter control signal $X_{ctrl}$.

It should be also understood that the transmission parameter control signal $X_{ctrl}$ is such a control signal produced by feeding back the next transmission parameter control signal $X_{next}$ corresponding to the output of the transmission parameter determining apparatus 111. The first through M-th transmission signals $s_1$ to $s_M$ are transmitted to the receiver apparatus 12 by the first through M-th transmitter antennas 104-1 to 104-M respectively.

Detected by first through N-th receiver antennas 105-1 to 105-N, first through N-th received signals $r_1$ to $r_N$ constitute inputs to both the transmission parameter estimating apparatus 107 and the demodulating apparatus 108.

As previously explained, the channel estimating apparatus 106 calculates an N×M channel matrix H of the below-mentioned formula 10 by using, for example, the pilot signal.

$$r = \begin{pmatrix} r_1 \\ r_2 \\ \vdots \\ r_N \end{pmatrix} \quad (10)$$

$$= \begin{pmatrix} h_{11} & h_{12} & \cdots & h_{1M} \\ h_{21} & h_{22} & \cdots & h_{2M} \\ \vdots & \vdots & \ddots & \vdots \\ h_{N1} & h_{N2} & \cdots & h_{NM} \end{pmatrix} \begin{pmatrix} s_1 \\ s_2 \\ \vdots \\ s_M \end{pmatrix} + \begin{pmatrix} n_1 \\ n_2 \\ \vdots \\ n_N \end{pmatrix}$$

$$= Hs + n.$$

The transmission parameter estimating apparatus 107 estimates a transmission parameter based upon the first through N-th received signals $r_1$ to $r_N$. The demodulating apparatus 108 is supplied with the channel matrix H and the first through N-th received signals $r_1$ to $r_N$, and furthermore, the transmission parameter estimated signal $X_{est}$ derived from the transmission parameter estimating apparatus 107 so as to produce first through M the demodulated signals $y_1$ through $y_M$. As a demodulating method, first of all, a demodulating method with employment of the channel matrix H may be used similar to the first embodiment through the third embodiment. In this case, the demodulating apparatus 108 produces the first through M-th demodulated signals $y_1$ $y_M$ In accordance with the below-mentioned formula 11. It should also be noted that $H^+=(H^HH)^{-1}H^H(N \geq M)$, $H^+=H^H(H^HH)^{-1}(N \leq M)$.

$$y = \begin{pmatrix} y_1 \\ y_2 \\ \vdots \\ y_M \end{pmatrix} \quad (11)$$

$$= H^+ r$$

$$= s + H^+ n$$

$$= \begin{pmatrix} s_1 \\ s_2 \\ \vdots \\ s_M \end{pmatrix} + H^+ \begin{pmatrix} n_1 \\ n_2 \\ \vdots \\ n_N \end{pmatrix}.$$

As other demodulating methods, a Maximum-Likelihood series estimating method, an interference canceller, and the like are conceived. In these other demodulating methods, the transmission parameter estimated signal $X_{est}$ is required in a demodulating operation. The demodulating apparatus 108 controls transmission parameters based upon the transmission parameter estimated signal $X_{est}$. These transmission parameters are used when a replica signal is produced in a Maximum-Likelihood series estimating method, a replica signal is produced in an interference canceller, and the like.

The decoding apparatus 109 converts the first through M-th demodulated signals $y_1$ to $y_M$ into first through M-th reproduced parallel signals $\hat{d}_1, \hat{d}_2, ---, \hat{d}_M$ based upon the transmission parameter estimated signal $X_{est}$. As the decoding apparatus 109, an MAP decoder, a soft judgment Viterbi decoder, and the like are employed. In the case that the decoding apparatus 109 demodulates, for example, from the first through M-th modulated signals $y_1$ to $y_M$ by using a bit likelihood ratio, this decoding apparatus 109 is to receive the channel matrix H from the channel estimating apparatus 106 since a channel variation received by the first through M-th transmission signals $s_1$ to $s_M$ is required.

The parallel-to-serial converting circuit 110 converts the first through M-th reproduced parallel signals $\hat{d}_1, \hat{d}_2, ---, \hat{d}_M$ into an output signal $d_{out}$, and then, produces this output signal $d_{out}$ from the receiver apparatus 12.

The transmission parameter determining apparatus 111 evaluates a line quality by using the first through M-th demodulated signals $y_1$ to $y_M$. For example, the transmission parameter determining apparatus 111 calculates the SINRs indicated in the above-described formula 6 so as to evaluate the line quality. Based upon the evaluated line quality, the transmission parameter determining apparatus 111 determines such a transmission parameter which is used in the next transmission operation, and then, produces a next transmission parameter control signal $X_{next}$. This next transmission parameter control signal $X_{next}$ is fed back to the transmitter apparatus 11.

In this embodiment, as the transmission parameter, the modulation levels such as the 4-value PSK and the 8-value PSK, the coding ratio in the error correction coding operation, the code word structure, and the like are used. As other transmission parameters, a spread ratio and a hopping pattern in a spread spectrum communication system may be used, and also, a carrier number and a transmission power distribution in a multi-carrier communication may be used.

It should also be noted that both the second and third embodiment have explained only such a mode that the apparatus (SNR estimating apparatus 501 and transmitting/receiving antenna-to-antenna SNR estimating apparatus 601) for calculating the physical amounts used to estimate the line quality, and also, the transmission parameter determining apparatus 111 are provided in the receiver apparatus 52 and 62. However, if the channel matrix from the transmitter apparatus 51 and 61 to the receiver apparatus 52 and 62 (namely, such a matrix for causing signals transmitted from transmitter apparatus 51 and 61 to be related to signals detected by receiver apparatus 52 and 62) is identical to the channel matrix from the receiver apparatus 52 and 62 to the transmitter apparatus 51 and 61 (namely, such a matrix for causing signals transmitted from receiver apparatus 52 and 62 to be related to signals detected by transmitter apparatus 51 and 61), then the channel matrix from the transmitter apparatus 51 and 61 to the receiver apparatus 52 and 62 may be estimated even in the transmitter apparatus 51 and 61.

Fifth Embodiment

Figure 7:
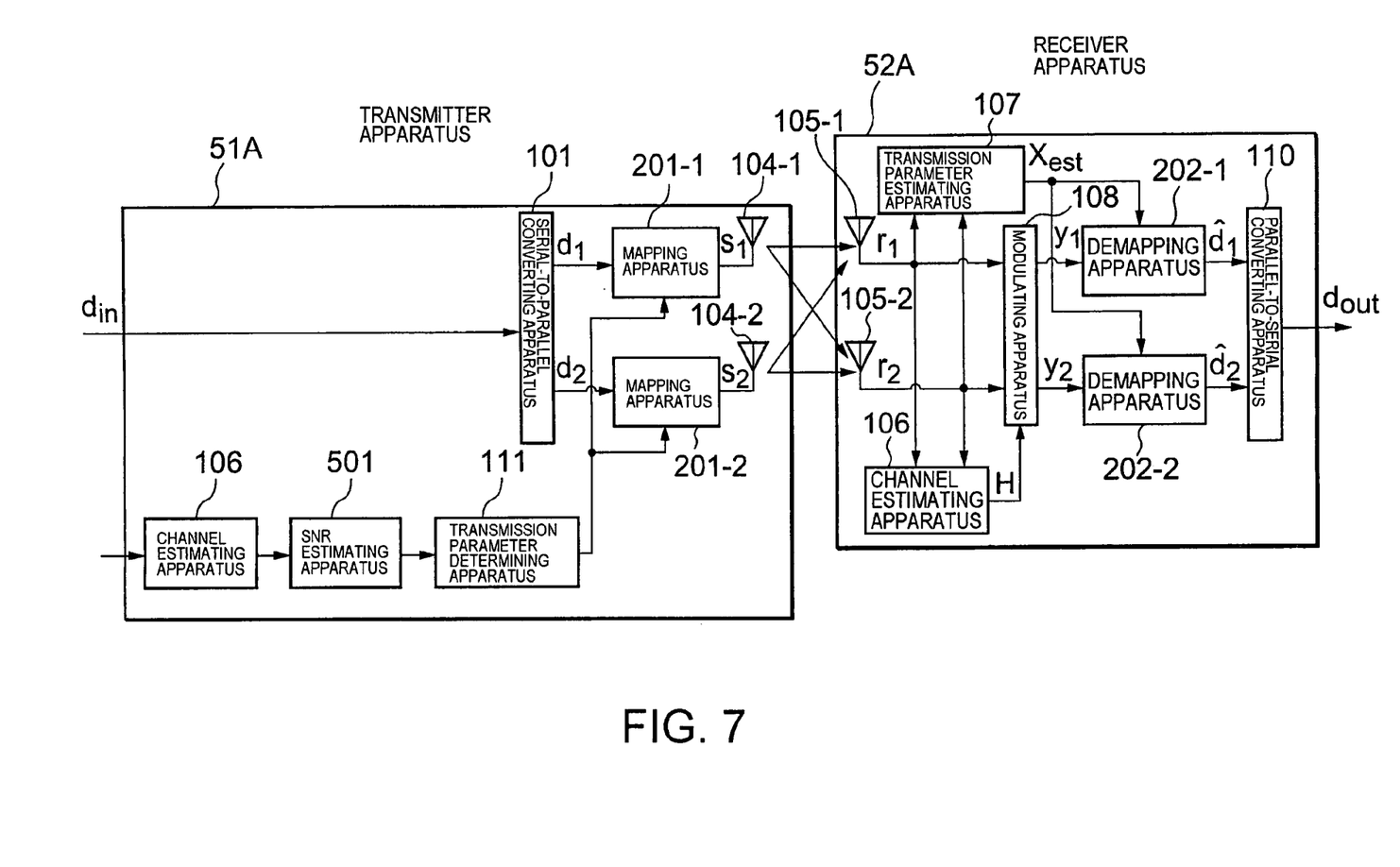
FIG. 7 is a block diagram for indicating an arrangement of a radio communication system according to a fifth embodiment of the present invention.

Referring now to FIG. 7, a description is made of a radio communication system according to a fifth embodiment of the present invention. The illustrated radio communication system comprises a similar arrangement to that of the radio communication system illustrated in FIG. 4 except for the following point. That is, a channel estimating apparatus 106, an SNR estimating apparatus 501, and a transmission parameter determining apparatus 111 are additionally employed in a transmitter apparatus 51A, and also, both the SNR estimating apparatus 501 and the transmission parameter determining apparatus 111 are omitted from a receiver apparatus 52A.

Although not illustrated in FIG. 7, the transmitter apparatus 51A comprises two antennas which are used to receive a transmission signal transmitted from the receiver apparatus 52A, and the received signals received by these two antennas are supplied to the channel estimating apparatus 106.

The radio communication system having such an arrangement may achieve a similar effect to that of the radio communication system according to the second embodiment illustrated in FIG. 4. In this case, the next transmission parameter control signal $X_{next}$ from the receiver apparatus 52A to the transmitter apparatus 51A need not be fed back, so that the radio resource may be saved. This reason is given as follows: That is, the physical amount (SNR) used to estimate the line quality in this case may be calculated only by the channel matrix, while the demodulated signals need not be measured.

Sixth Embodiment

Figure 8:
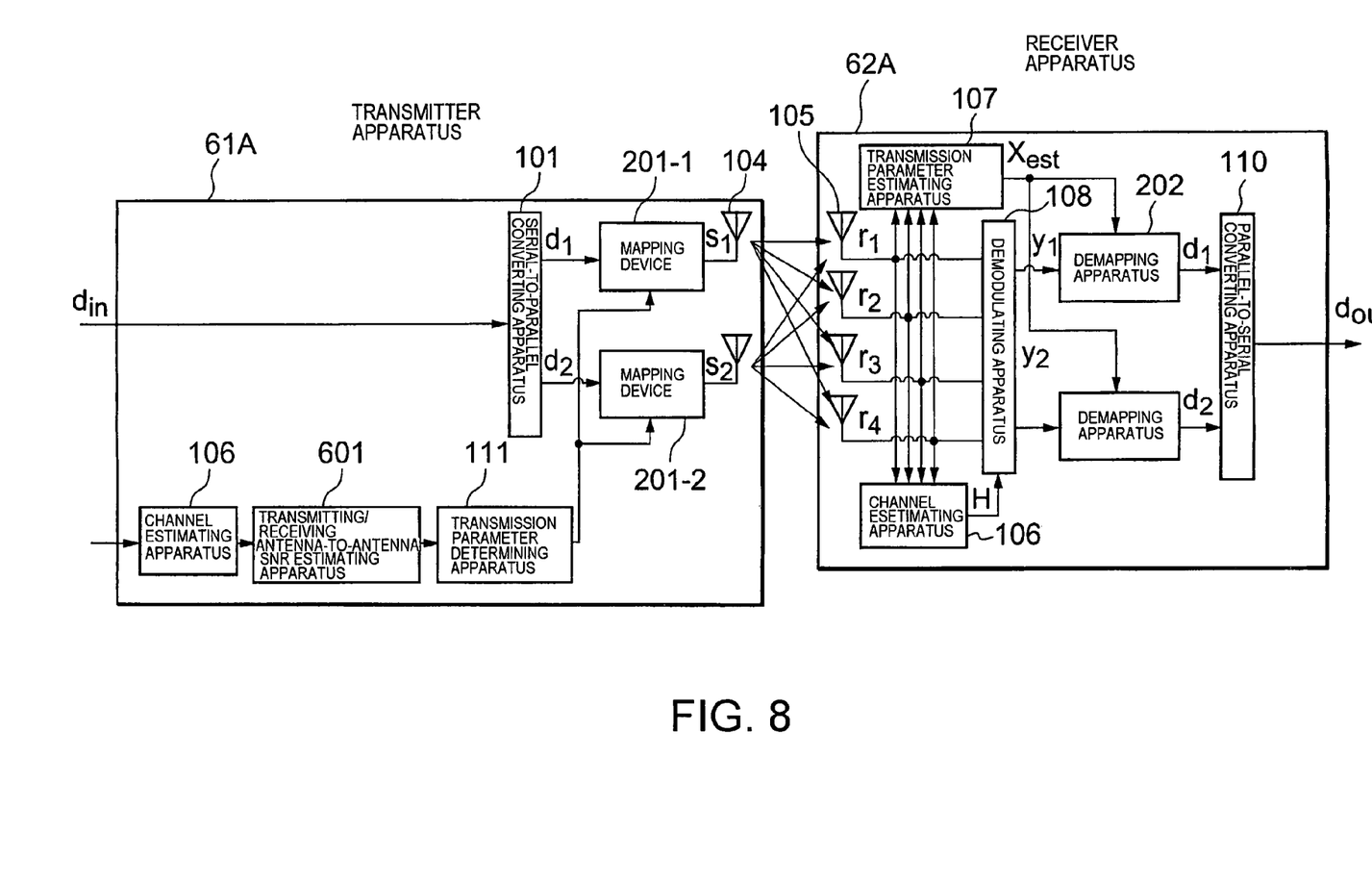
FIG. 8 is a block diagram for showing an arrangement of a radio communication system according to a sixth embodiment of the present invention.

Referring now to FIG. 8, a description is made of a radio communication system according to a sixth embodiment of the present invention. The illustrated radio communication system comprises a similar arrangement to that of the radio communication system illustrated in FIG. 5 except for the following point. That is, a channel estimating apparatus 106, a transmitting/receiving antenna-to-antenna SNR estimating apparatus 601, and a transmission parameter determining apparatus 111 are additionally employed in a transmitter apparatus 61A, and also, both the transmitting/receiving antenna-to-antenna SNR estimating apparatus 601 and the transmission parameter determining apparatus 111 are omitted from a receiver apparatus 62A.

Although not illustrated in FIG. 8, the transmitter apparatus 61A comprises two antennas which are used to receive a transmission signal transmitted from the receiver apparatus 62A, and the received signals received by these two antennas are supplied to the channel estimating apparatus 106.

The radio communication system having such an arrangement may achieve a similar effect to that of the radio communication system according to the third embodiment illustrated in FIG. 5. In this case, the next transmission parameter control signal $X_{next}$ from the receiver apparatus 62A to the transmitter apparatus 61A need not be fed back, so that the radio resource may be saved. This reason is given as follows: That is, the physical amount (transmitting/receiving antenna-to-antenna SNR) used to estimate the line quality in this case may be calculated only by the channel matrix, while the demodulated signals need not be measured.

The invention claimed is:

1. A receiver apparatus for receiving, by a plurality of receiver antennas, transmission signals transmitted from a transmitter apparatus by a plurality of transmitter antennas in a parallel manner and for estimating a channel matrix for causing the transmission signals to be related to received signals to demodulate the received signals based upon said channel matrix; the receiver apparatus comprising:
calculation means for calculating a physical amount so as to estimate a radio line quality with respect to each of signal series based upon only said channel matrix;
determination means for evaluating the radio line quality based upon the physical amount calculated by said calculation means so as to determine a transmission parameter in a next transmission operation by said transmitter apparatus with respect to each of the signal series;
transmission means for transmitting the transmission parameter determined by said determination means to said transmitter apparatus; and
detection means for detecting a change in the transmission parameter from the received signals with respect to each of the signal series,
wherein the transmission parameter is a modulation level in mapping.

2. A receiver apparatus as claimed in claim 1 wherein, said physical amount is a signal-to-noise ratio (SNR) of said demodulated signals.

3. A receiver apparatus as claimed in claim 1 wherein, said physical amount corresponds to a sum of signal-to-noise ratios (SNRs) of signals which are detected by said plurality of receiver antennas when it is assumed that said plurality of transmitter antennas separately transmit signals.

4. A receiver apparatus as claimed in claim 3 wherein, said physical amount corresponds to a sum of one, or a plurality of said SNRs having larger values.

5. A receiver apparatus as claimed in claim 1, wherein said estimates the channel matrix using a pilot signal output by said transmitter apparatus, and wherein no information obtained by demodulating the received signals is utilized by said calculation means in calculating the physical amount.

6. A radio communication system comprising a transmitter apparatus for transmitting transmission signals by a plurality of transmitter antennas in a parallel manner; and a receiver apparatus for receiving said transmission signals by a plurality of receiver antennas, a for estimating a channel matrix for causing the transmission signals to be related to received signals to demodulate the received signals based upon said channel matrix; wherein
said receiver apparatus comprises:
calculation means for calculating a physical amount so as to estimate a radio line quality with respect to each of signal series based upon only said channel matrix;
determination means for evaluating the radio line quality based upon the physical amount calculated by said calculation means so as to determine a transmission parameter in a next transmission operation by said transmitter apparatus with respect to each of the signal series;
transmission means for transmitting the transmission parameter determined by said determination means to said transmitter apparatus; and
detection means for detecting a change in the transmission parameter from the received signals with respect to each of the signal series; and wherein,
said transmitter apparatus comprises:
reception means for receiving said transmission parameter transmitted by said determining means; and
means for controlling the transmission operation with respect to each of the signal series based upon said transmission parameter received by said reception means,
wherein the transmission parameter is a modulation level in mapping.

7. A radio communication system as claimed in claim 6 wherein,
said physical amount is a signal-to-noise ratio (SNR) of said demodulated signals.

8. A radio communication system as claimed in claim 6 wherein,
said physical amount corresponds to a sum of signal-to-noise ratios (SNRs) of signals which are detected by said plurality of receiver antennas when it is assumed that said plurality of transmitter antennas separately transmit signals.

9. A radio communication system as claimed in claim 8 wherein,
said physical amount corresponds to a sum of one, or a plurality of said SNRs having larger values.

10. A radio communication system as claimed in claim 6, wherein said estimates the channel matrix using a pilot signal output by said transmitter apparatus, and wherein no information obtained by demodulating the received signals is utilized by said calculation means in calculating the physical amount.

11. A transmitter apparatus for transmitting data by a plurality of transmitter antennas in a parallel manner to a receiver apparatus for receiving by a plurality of receiver antennas, said transmitter apparatus being used in a radio communication system in which a channel matrix for causing the signal transmitted by said transmitter apparatus to be related to said signal detected by said receiver apparatus becomes identical to a channel matrix for causing the signal transmitted by said receiver apparatus to be related to said signal detected by said transmitter apparatus; wherein, said transmitter apparatus comprises:
estimation means for estimating said channel matrix;
calculation means for calculating a physical amount so as to estimate a radio line quality with respect to each of signal series based upon only said channel matrix;
determination means for evaluating the radio line quality based upon the physical amount calculated by said calculation means so as to determine a transmission parameter in a next transmission operation with respect to each of the signal series based upon the transmission parameter determined by said determination means,
wherein the transmission parameter is a modulation level in mapping.

12. A transmitter apparatus as claimed in claim 11 wherein, said physical amount corresponds to a signal-to-noise ratio (SNR) of demodulated signals of said receiver apparatus.

13. A transmitter apparatus as claimed in claim 11 wherein, said physical amount corresponds to a sum of signal-to-noise ratios (SNRs) of signals which are detected by said plurality of receiver antennas when it is assumed that said plurality of transmitter antennas separately transmit signals.

14. A transmitter apparatus as claimed in claim 13 wherein, said physical amount corresponds to a sum of one, or a plurality of said SNRs having larger values.

15. A transmitter apparatus as claimed in claim 11, wherein said estimates the channel matrix using a pilot signal output by said transmitter apparatus, and wherein no information obtained by demodulating the received signals is utilized by said calculation means in calculating the physical amount.

16. A radio communication system comprising a transmitter apparatus for transmitting transmission signals by a plurality of transmitter antennas in a parallel manner; and a receiver apparatus for receiving said transmission signals by a plurality of receiver antennas, a channel matrix for causing the signal transmitted by said transmitter apparatus to be related to said signal detected by said receiver apparatus becomes identical to a channel matrix for causing the signal transmitted by said receiver apparatus to be related to said signal detected by said transmitter apparatus; wherein, said transmitter apparatus comprises:
estimation means for estimating said channel matrix;
calculation means for calculating a physical amount so as to estimate a radio line quality with respect to each of signal series based upon only said channel matrix;
determination means for evaluating the radio line quality based upon the physical amount calculated by said calculation means so as to determine a transmission parameter in a next transmission operation with respect to each of signal series; and
means for controlling the transmission operation with respect to each of the signal series based upon the transmission parameter determined by said determination means; and wherein,
said receiver apparatus comprises:
means for detecting a change in said transmission parameter from the signals received from said transmitter apparatus with respect to each of signal series,
wherein the transmission parameter is a modulation level in mapping.

17. A radio communication system as claimed in claim 16 wherein,
said physical amount corresponds to a signal-to-noise ratio (SNR) of demodulated signals of said receiver apparatus.

18. A radio communication system as claimed in claim 16 wherein,
said physical amount corresponds to a sum of signal-to-noise ratios (SNRs) of signals which are detected by said plurality of receiver antennas when it is assumed that said plurality of transmitter antennas separately transmit signals.

19. A radio communication system as claimed in claim 18 wherein,
said physical amount corresponds to a sum of one, or a plurality of said SNRs having larger values.

20. A radio communication system as claimed in claim 16, wherein said estimates the channel matrix using a pilot signal output by said transmitter apparatus, and wherein no information obtained by demodulating the received signals is utilized by said calculation means in calculating the physical amount.

* * * * *